(12) United States Patent
Tudose

(10) Patent No.: US 8,073,817 B2
(45) Date of Patent: Dec. 6, 2011

(54) METHOD FOR GENERATING AN ELECTRONICALLY STORABLE DIGITAL MAP

(75) Inventor: Radu Tudose, Würzburg (DE)

(73) Assignee: Navigon AG, Hamburg (DE)

( * ) Notice: Subject to any disclaimer, the term of this patent is extended or adjusted under 35 U.S.C. 154(b) by 501 days.

(21) Appl. No.: 12/329,763

(22) Filed: Dec. 8, 2008

(65) Prior Publication Data

US 2009/0164505 A1 Jun. 25, 2009

(30) Foreign Application Priority Data

Dec. 21, 2007 (DE) .......................... 10 2007 062 991

(51) Int. Cl.
*G06F 7/00* (2006.01)
*G06F 17/00* (2006.01)
(52) U.S. Cl. ...................................................... 707/679
(58) Field of Classification Search .................. 707/679, 707/999.204
See application file for complete search history.

(56) References Cited

U.S. PATENT DOCUMENTS

| 6,385,539 | B1 | 5/2002 | Wilson et al. | |
| 6,510,382 | B2 | 1/2003 | Wilson | |
| 2004/0236620 | A1* | 11/2004 | Chauhan et al. | 705/9 |
| 2006/0288014 | A1* | 12/2006 | Edwards et al. | 707/100 |
| 2007/0288534 | A1* | 12/2007 | Zak et al. | 707/204 |
| 2009/0132316 | A1* | 5/2009 | Florance et al. | 705/7 |

FOREIGN PATENT DOCUMENTS

| DE | 10041277 A1 | 5/2001 |
| DE | 10103714 A1 | 8/2001 |

* cited by examiner

*Primary Examiner* — Cam Truong
(74) *Attorney, Agent, or Firm* — Samuel M. Korte

(57) ABSTRACT

A method for generating a digital map that can be stored on an electronic storage medium and in which a geographic area is described by a multitude of data sets includes the following steps:
a) loading an original database (01), in which the geographic area is described by a multitude of data sets, into an electronic analyzer, wherein each data set describes an object of the map, wherein each data set consists of a defined number of attributes, and wherein each attribute may assume a defined number of different attribute values,
b) detecting attribute value combinations or attribute value subcombinations that occur in the data sets of the database,
c) assigning a distinct combination characteristic to each attribute value combination or attribute value subcombination,
d) storing the attribute value combinations or attribute value subcombinations detected in the database with the respectively assigned combination characteristics as a first partial database (02) of the digital map,
e) analyzing all data sets of the original database (01), wherein a new data set is generated for each data set by replacing the attribute value combinations or attribute value subcombinations that exist in each data set with the combination characteristic assigned to the attribute value combinations or attribute value subcombinations, and
f) storing the new data sets in a second partial database (03) of the digital map.

13 Claims, 3 Drawing Sheets

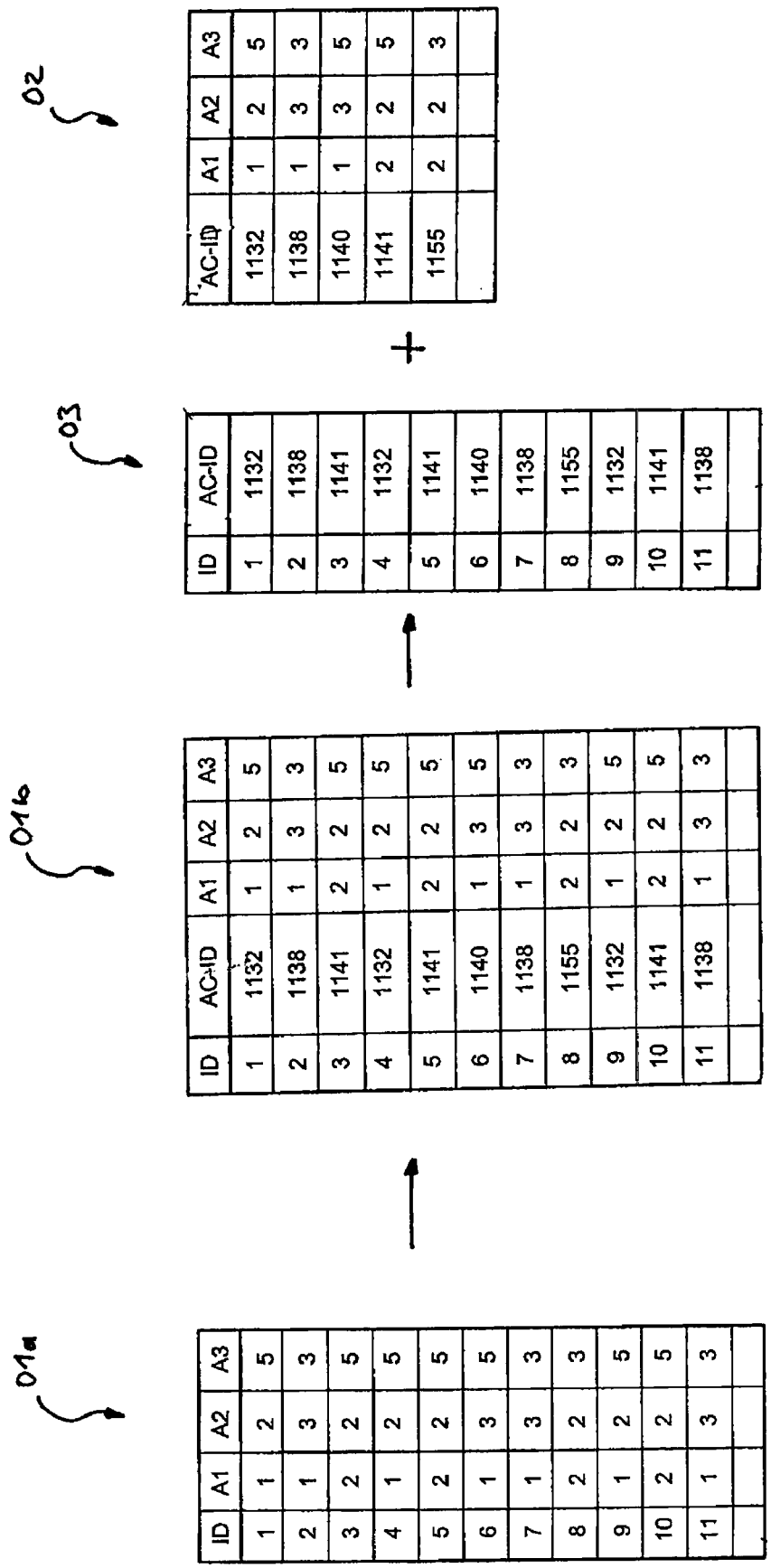

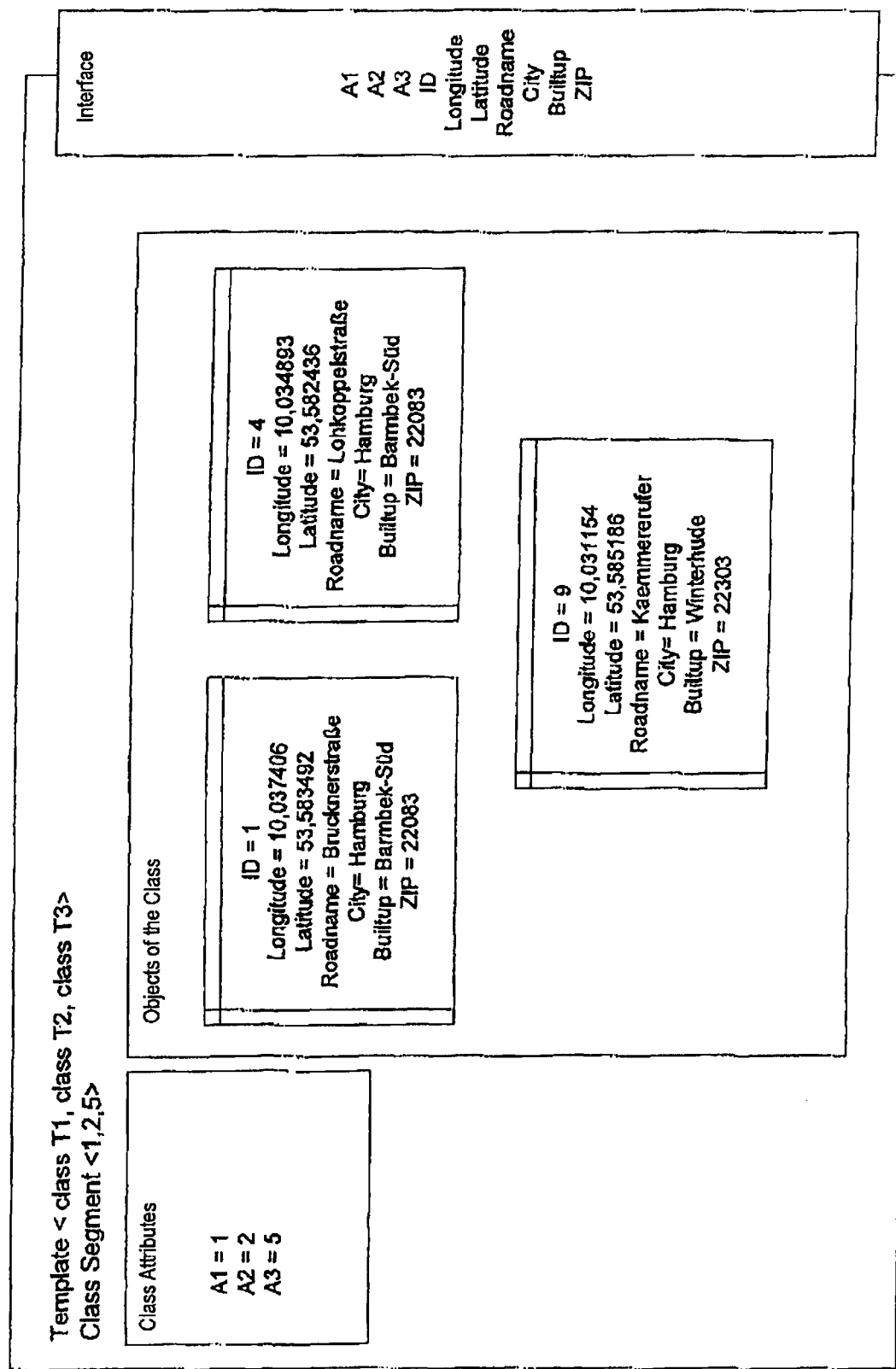

METHOD FOR GENERATING AN ELECTRONICALLY STORABLE DIGITAL MAP

CROSS-REFERENCE TO RELATED APPLICATION

This application claims the priority benefit of German Patent Application No. 10 2007 062 991.7 filed on Dec. 21, 2007, the contents of which are hereby incorporated by reference as if fully set forth herein in their entirety.

STATEMENT CONCERNING FEDERALLY SPONSORED RESEARCH OR DEVELOPMENT

Not applicable.

FIELD OF THE INVENTION

The invention pertains to a method for generating a digital map that can be stored on an electronic storage medium.

BACKGROUND OF THE INVENTION

Digital maps that can be stored on an electronic storage medium are used, for example, but by no means exclusively, for the operation of mobile or permanently installed navigation devices. In this case, the satellite navigation is based on the description of a geographic area such as, for example, the road network of Germany by a multitude of digital data sets.

In known navigation devices, databases that contain a multitude of such data sets are provided in order to describe the geographic area, wherein each data set describes an object of the map such as, for example, a road section or a terrain segment. These databases that are known from the prior art and contain data sets for describing map objects are referred to as original databases below. In this case, each data set for describing a map object consists of a certain number of attributes that can respectively assume a certain number of different attribute values. The attributes may consist, for example, of the geographic position of the map object and of the specification as a road section.

When operating devices, particularly navigation devices, or when utilizing such databases for describing a digital map, the data sets stored in the database need to be retrieved many times. During the composition of the graphic illustration of a section of the map, in particular, the data sets for describing the map objects in this section need to be read out of the database and processed by a graphics processor. If the map section changes in rapid succession, for example, due to the vehicle driving through the geographic area or the user manipulating the map section to be displayed, very many data sets with the attributes contained therein need to be read out and processed. In this case, the data quantities to be processed may be very large because the individual map objects need to be respectively specified by a multitude of attribute values and the new area itself contains a large quantity of map objects.

Consequently, very large quantities of data need to be managed when utilizing databases (original databases) known from the prior art for electronically processing digital maps, particularly for the graphic illustration thereof. This is a significant disadvantage because it is either necessary to provide a correspondingly large and fast main memory or the respective data needs to be very often read out of a mass memory and copied into the main memory.

SUMMARY OF THE INVENTION

The present invention therefore is based on the objective of proposing a method for generating a digital map that makes it possible to save storage space and to utilize the computing capacity more effectively.

This objective is attained in one embodiment of the invention with a method for generating a digital map that can be stored on an electronic storage medium and in which a geographic area is described by a multitude of data sets. The method includes the following steps:
  a) loading an original database, in which the geographic area is described by a multitude of data sets, into an electronic analyzer, wherein each data set describes an object of the map, wherein each data set consists of a defined number of attributes, and wherein each attribute may assume a defined number of different attribute values,
  b) detecting attribute value combinations or attribute value subcombinations that occur in the data sets of the database,
  c) assigning a distinct combination characteristic to each attribute value combination or attribute value subcombination,
  d) storing the attribute value combinations or attribute value subcombinations detected in the database with the respectively assigned combination characteristics as a first partial database of the digital map,
  e) analyzing all data sets of the original database, wherein a new data set is generated for each data set by replacing the attribute value combinations or attribute value subcombinations that exist in each data set with the combination characteristic assigned to the attribute value combinations or attribute value subcombinations, and
  f) storing the new data sets in a second partial database of the digital map.

The invention also aims to propose a new navigation device that requires less storage space and has a higher efficiency. This objective is attained with a navigation device having memory in which are stored two partial databases generated with the above method are at least partially stored in the memory.

The inventive method is based on the fundamental idea that certain attribute value combinations or attribute value subcombinations occur very frequently in the data sets for describing the map objects. This means that a lot of storage space is required because these frequently used attribute value combinations or attribute value subcombinations are respectively stored several times in the individual data sets of the known databases for describing a digital map. The required storage space can be reduced and the processing speed can be increased by cleverly re-storing this data.

According to one embodiment of the invention, the original database therefore is initially analyzed in an analyzer and it is determined during this analysis which attribute value combinations or attribute value subcombinations occur in the different data sets. A distinct combination characteristic is then assigned to each of the occurring attribute value combinations or attribute value subcombinations. The attribute value combinations or attribute value subcombinations detected during the analysis are stored in a new first partial database with the respectively assigned combination characteristic.

Subsequently, the data sets of the original database are once again analyzed and a new data set is generated from each data set by replacing the attribute value combinations or attribute value subcombinations detected in the respective data sets with the assigned combination characteristic. This new data that was created by replacing the attribute value combinations or attribute value subcombinations with the assigned combination characteristic are then stored in the form of new data sets in a new second partial database of the digital map.

According to the inventive method, the original database consequently is mapped in two partial databases. In this case, the occurring attribute value combinations or attribute value subcombinations are stored in the first partial database together with a distinct combination characteristic assigned thereto. The individual data sets of the original database are re-stored in the second partial database by replacing the respectively detected attribute value combinations or attribute value subcombinations with the respectively assigned combination characteristic. If the original database contains new attribute value combinations that do not recur in each data set, the utilization of the inventive method does not make it possible to reduce the storage space. However, since digital maps very frequently contain attribute value combinations or attribute value subcombinations that need to be repeatedly stored in a large quantity of data sets, a significant data reduction can be achieved with the inventive mapping of the original database in the two partial databases.

The data generated with the inventive method essentially can be additionally processed in the two partial databases in any suitable way. For example, if the two partial databases are stored in a mass memory in a navigation system, the partial databases need to be at least partially re-stored in the main memory of the navigation system in order to realize the processing, for example, to display a map section. In the simplest variation, the relevant parts of the two partial databases can be copied from the mass memory to the main memory in order to realize the current processing. However, it is particularly advantageous if the relevant data is re-stored based on the principles of object-oriented programming. This may be realized, in particular, as part of the re-storing of the data by generating a new data class with assigned class designation when a new attribute value combination or a new attribute value subcombination that has not occurred so far is detected. Each of these data classes is assigned a certain data set type characterized by several class attributes that are respectively specific to data set types. The combination of these class attributes of the newly generated data class corresponds identically to the newly detected attribute value combination or attribute value subcombination in this case.

The class designation of the newly generated data class can then be defined as the combination characteristic of the newly detected attribute value combination or attribute value subcombination.

The data of the second partial database is analyzed as to the occurrence of the attribute value combinations or attribute value subcombinations, the combination of which exactly corresponds to the class attributes of a certain data class. These data sets are then mapped in a new data set in exactly this data class, wherein the distinct assignment to the class attributes is ensured due to the class designation assigned to the data class.

If the data sets of the two partial databases for describing the map objects are mapped in data sets of a certain data class during the re-storing, variable attribute values such as, for example, the coordinates of the geographic position of the corresponding object need to be stored as specific to the respective data set and thusly require a much processing capacity. This processing capacity can be reduced by utilizing a variation of the method with data class models. According to this variation of the method, a new data class model with assigned class model designation is generated when a new attribute value combination is detected. Each data class model represents a new data type that is characterized by several unchangeable class attributes and a certain number of changeable model attributes. The combination of the unchangeable class attributes of the data class model identically corresponds to the newly detected attribute value subcombination in this case. The variably changeable model attributes, in contrast, can be changed referred to the data sets such that, for example, the respective geographic position coordinates can be stored as changeable model attributes.

The class model designation of the new data class model once again serves as distinct combination characteristic.

During the analysis of the data, the data sets of the partial databases are then mapped in new data sets, wherein each data set corresponds to a certain data class model.

An improved storage management can be realized with the inventive method and the corresponding data preparation of the data sets required for the description of a geographic area.

The original database is very frequently stored on a server outside a navigation device, wherein the data sets are analyzed, according to the invention, with an analyzer installed on the server, and wherein the first partial database and/or the second partial database of the digital map is/are transferred to a memory of the navigation device. The inventive mapping of the original database in two partial databases is then realized by means of an analyzer installed on the server. Subsequently, the two partial databases are transmitted to the navigation device.

If the two partial databases generated after the analysis are stored in a mass memory, it is therefore possible to directly store the two partial databases or to at least partially store the data sets of a data class derived from the partial databases or the data sets of a data class model derived from the partial databases in a main memory of the navigation device. It would be possible, in particular, to store the two partial databases in an unchangeable fashion in a mass memory, for example, on a DVD or a CD-ROM or on a fixed disk. In order to reduce the storage space required for the preparation of this data, the two partial databases are, according to the invention, subsequently re-stored. During the utilization of the two partial databases, in particular, in a navigation device, these partial databases are then at least partially stored in the main memory. Due to these measures, the storage space available in the main memory can be used more efficiently and caching techniques can be effectively utilized.

The inventive method essentially can be utilized on any suitable device. The utilization of the inventive method provides particularly significant advantages in the operation of navigation devices. In this case, it would be conceivable, in particular, that the mass memory of the navigation device contains the original database and the inventive mapping of the original database in the two partial databases is carried out by an analyzer that is installed on the navigation device and may be realized, for example, in the form of corresponding software. The mass memory of the navigation device may be realized, in particular, in the form of a fixed disk, a CD-ROM or another memory card in this case.

The utilization of the two inventive partial databases provides particularly significant advantages in the graphic illustration of a digital map on a display unit of a terminal, particularly a navigation device. Due to the inventive data reduction, more map objects can be read into the fast main memory and can be processed therein by the image generator with fast access times.

According to another preferred variation of the method, data sets of the original database that serve for describing map elements situated in a certain position are mapped in two data sets of the two partial databases in a certain way during the generation of the two partial databases. The data sets in the second partial database contain the position coordinates of the map element in this case because these position attributes are respectively specific to a data set. The first partial database, in contrast, contains the characteristic attributes of all map elements with the same attribute value subcombination, particularly a road function class attribute and/or a road category attribute and/or a shape attribute and/or a driving direction attribute.

If data class models are used in the generation of the two partial databases, it is proposed that, in data sets that serve for describing map elements situated in a certain position, the position coordinates of the map elements are stored as changeable model attributes and the characteristic attributes of the map elements are stored as class attributes.

The two inventive partial databases may also be respectively divided into several sub-partial databases. In this case, two sub-partial databases are respectively assigned to one another in a paired fashion. Certain map object types such as, for example, segments, points, polygons, streets, towns, points of interest (POI), regions or municipalities can then be respectively stored in certain pairs of a first sub-partial database and a second sub-partial database that are assigned to this map object type.

One embodiment of the inventive navigation device includes two partial databases according to the characteristics of the inventive method are stored in a memory of the navigation device.

The memory for storing at least parts of the two partial databases preferably should be realized in the form of the fast main memory of the navigation device because the inventive data reduction makes it possible to thusly make available a multitude of objects for the illustration of the map in the main memory.

Different aspects of the inventive method are schematically illustrated in the drawings and are described in an exemplary fashion below.

BRIEF DESCRIPTION OF THE DRAWINGS

FIG. 1 shows a schematically illustrated original database;
FIG. 2 shows the original database after carrying out a first analysis step and the identification of attribute value combinations;
FIG. 3 shows the first and the second partial database derived from the original database according to FIG. 2;
FIG. 5 shows a schematic representation of the main memory organization in the navigation device after reading out map data objects.

DETAILED DESCRIPTION OF THE EXAMPLE EMBODIMENTS

Figure 4:
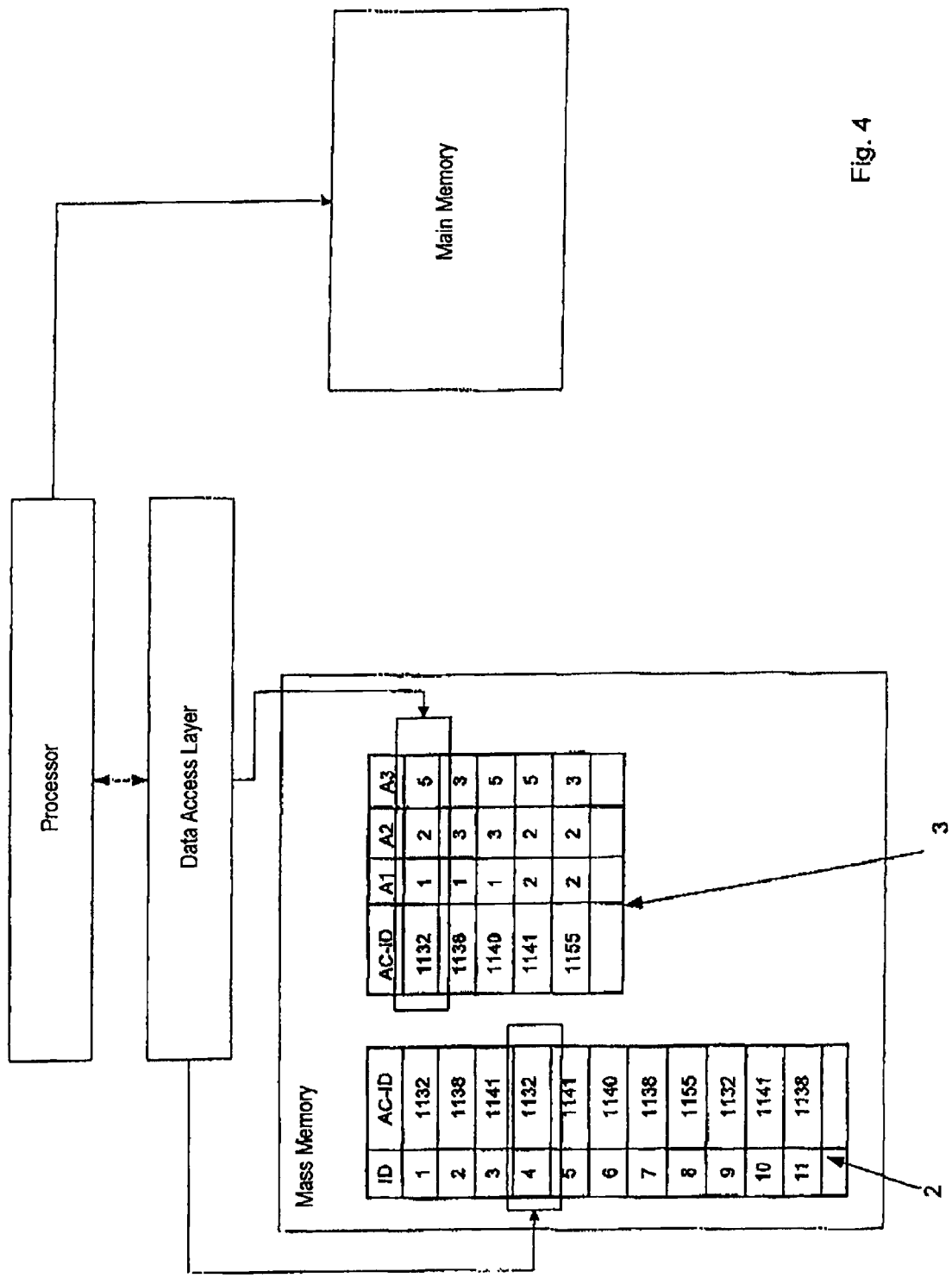
FIG. 4 shows a schematic representation of the access to the stored partial databases in a navigation device.

FIG. 1 shows a schematically indicated original database 01a that merely contains eleven data sets with three respective attribute values for the attributes A1, A2 and A3 in the example shown. In this case, each individual data set can be identified by a data set ID. An actual database may contain several hundred thousand individual data sets with different attribute value combinations.

FIG. 2 shows the original database 01 after an analysis for detecting identical attribute value combinations. In this case, the analysis shows that five different attribute value combinations are contained in the original database 01b. A distinct combination characteristic is assigned to each attribute value combination in the column AC-ID. The combination characteristic 1132 describes the attribute value combination A1=1, A2=2 and A3=5 in this case. The combination characteristic AC-ID=1138 is characterized by the attribute value combination A1=1, A2=3 and A3=3.

According to FIG. 3, the original database 01b analyzed in the intermediate step is mapped in a first partial database 02 and a second partial database 03. In this case, the first partial database 02 contains all occurring attribute value combinations with the respectively assigned combination characteristic AC-ID. In the second partial database 03, the eleven different data sets are now characterized by the respectively assigned combination characteristic, wherein the individual values of A1, A2 and A3 are no longer stored in the second partial database 03. In the very simple example illustrated in FIG. 1 to FIG. 3, the originally required storage space of altogether 44 storage spaces (4×11) is already reduced to 42 storage spaces (2×11+5×4). If the original database 01 contains a very large number of data sets with respectively identical attribute value combination, a correspondingly higher reduction of the required storage space can be achieved.

FIG. 4 shows the access, within the navigation system, to the map objects that, according to the inventive method, are stored in the two partial databases (02, 03), wherein the partial databases are stored in a mass memory, e.g., on a CD, an SD-card or a fixed disk.

The data access layer receives the command to read out the data of the map element with the ID 4 via the processor, e.g., due to an action for displaying a map on the monitor of the navigation system. The data access layer now searches the first partial database 02 for the data set with the ID 4. In this data set, the attribute value subcombination characteristic 1132 is stored—in addition to variable information. Consequently, the data access layer reads the attribute data of the attribute data combination with the AC-ID 1132 out of the second partial database 03. This data is collectively transferred to the processor that suitably stores the data in the main memory.

FIG. 5 shows an exemplary organization of the data in the main memory. This figure shows a map object class, in this case a segment, that is structured in the form of a template with the class attributes A1, A2 and A3. Due to the template instantiation based on the attribute values of the partial database 03, the class attributes are assigned the template arguments T1, T2 and T3. In the example shown, these are the values 1, 2 and 5.

The map objects with the IDs 1, 4 and 9 were read out of the partial database 02, and objects of the template class segments with the template attributes 1, 2 and 5 were generated based on the attribute combination of the partial database 03. The variable attributes such as the position coordinates, streets and the city name, etc., are individually stored in the objects. In the class attributes, in contrast, the values are read out of the partial database 03 once for all objects of this class. The access to all objects of this class is realized via the interface, in which all attributes, i.e., class attributes and object attributes, can be accessed together and on the same path. A system component that accesses the interface therefore is unable to recognize whether one of the read-out attributes is a class attribute or an object attribute.

While there has been shown and described what are at present considered the preferred embodiment of the invention, it will be obvious to those skilled in the art that various changes and modifications can be made therein without departing from the scope of the invention defined by the appended claims. Therefore, various alternatives and embodiments are contemplated as being within the scope of the following claims particularly pointing out and distinctly claiming the subject matter regarded as the invention.

The invention claimed is:

1. A method for generating a digital map that is stored on an electronic storage medium and in which a geographic area is described by a multitude of data sets, the method comprising the following steps:
   a) loading an original database, in which the geographic area is described by the multitude of data sets, into an electronic analyzer, wherein each data set describes an object of the digital map, wherein said each data set consists of a defined number of attributes, and wherein each attribute assumes a defined number of different attribute values,
   b) detecting attribute value combinations or attribute value subcombinations that occur in the data sets of the database,
   c) assigning a distinct combination characteristic to each attribute value combination or attribute value subcombination,
   d) storing the attribute value combinations or attribute value subcombinations detected in the database with respectively assigned combination characteristics as a first partial database of the digital map,
   e) analyzing all data sets of the original database, wherein a new data set is generated for each data set of the all data sets by replacing the attribute value combinations or attribute value subcombinations that exist in said each data set with the combination characteristic assigned to the attribute value combinations or attribute value subcombinations, and
   f) storing the new data sets in a second partial database of the digital map, wherein a new data class model with an assigned class model designation is respectively generated when a new attribute value subcombination is detected, wherein each data class model describes a certain data type by several unchangeable class attributes and a certain number of changeable model attributes, and wherein the combination of unchangeable class attributes of new data set model corresponds identically to newly detected attribute value subcombination, the class model designation of newly generated data class model is set as combination characteristic,
   all new data class models are stored with respectively assigned class attributes and model attributes and respectively assigned class model designation,
   upon the detection of a data set, the attribute value subcombination corresponds to a certain data class model and attributes that remain in addition to the attribute value subcombination correspond to a type and a number of changeable model attributes of a new data class model, a new data set of the new data class model is generated, and
   the new data sets of the digital map are stored as data sets of assigned data class model, wherein the attributes of the data set that remain in addition to the attribute value subcombination are stored as variable values in storage areas of the new data sets that are reserved for the model attributes.

2. The method according to claim 1, in which the first partial database and the second partial database are re-stored, wherein
   b1) a new data class with an assigned class designation is respectively generated when a new attribute value combination or attribute value subcombination is detected, wherein each data class describes a certain data set type by several class attributes, and wherein the combination of the class attributes of the new data class corresponds identically to newly detected attribute value combination or attribute value subcombination,
   c1) the class designation of the newly generated data class is set as combination characteristic,
   d1) all new data classes are stored with respectively assigned class attributes and respectively assigned class designation,
   e1) upon the detection of a data set, the attribute value combination or attribute value subcombination of which corresponds to the combination of the class attributes of a certain data class, a new data set of data class is generated, and
   f1) the new data sets of the digital map are stored as data sets of assigned data class.

3. The method according to claim 1, in which the original database is stored on a server outside a navigation device, wherein the data sets are analyzed with an analyzer that is installed on the server, and wherein at least one of the first partial database and the second partial database of the digital map is transferred to a memory of the navigation device.

4. The method according to claim 1, in which the partial databases generated after the analysis are stored in a mass memory, wherein the partial databases or the data sets of a data class derived from the partial databases or the data sets of a data class model derived from the partial databases are at least partially stored in a main memory of the navigation device.

5. The method according to claim 4, in which at least one of the mass memory and the main memory form part of a navigation device.

6. The method according to claim 4, in which the mass memory is realized in a form of a fixed disk, a CD-ROM or a memory card.

7. The method according to claim 1, wherein several data sets of at least one of the first partial database and the second partial database of the digital map are read out and additionally processed by an image generator in order to generate a graphic map illustration on a display unit of a terminal, particularly a navigation device.

8. The method according to claim 1, during the generation of the partial databases, data sets of the original database that serve for describing map elements situated in a certain position are mapped in at least two new data sets in the partial databases, namely in a way that the new data set in the second partial database contains the position coordinates of map element and the new data set in the first partial database contains a characteristic attribute of the map element.

9. The method according to claim 1, in which the position coordinates of map element are stored as changeable model attributes of a data set of a certain data class model, wherein the characteristic attributes of the map element correspond to the class attributes of data class model.

10. The method according to claim 1, in which the partial databases are respectively divided into several sub-partial databases that are assigned to one another in a paired fashion, wherein data sets for describing certain map object types, particularly segments, points, polygons, streets, towns, points of interest (POI), regions or municipalities, are respectively stored in certain pairs of a first sub-partial database and a second sub-partial database that are assigned to a map object type.

11. A navigation device comprising a memory, in which a digital map for describing a geographic area is stored, in which partial databases generated with a method according to claim 1 are at least partially stored in the memory.

12. The navigation device according to claim 11, in which the memory of the navigation device consists of a fast main memory that can be directly accessed by a processor unit of the navigation device.

13. The navigation device according to claim 11, in which the navigation device comprises a mass memory.

* * * * *